INVENTOR.
ROLAND A. GLADSTONE
BY Alfred M. Feldman
ATTORNEY

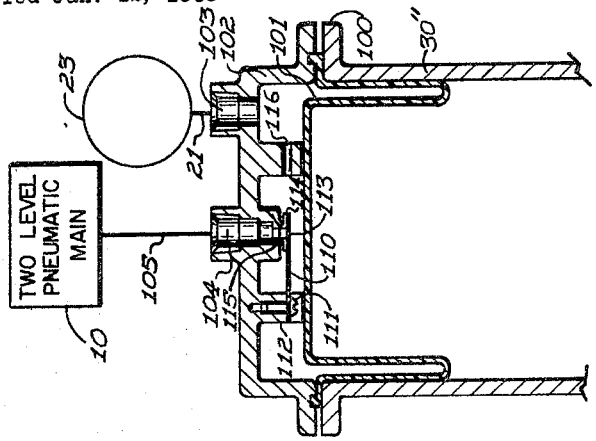
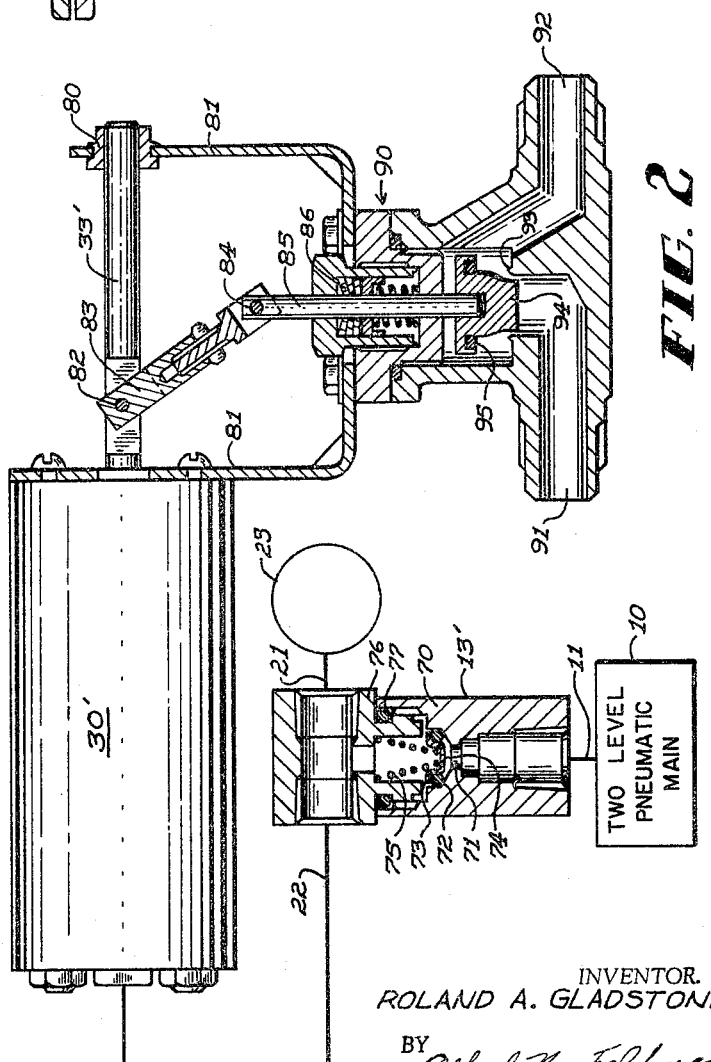

United States Patent Office 3,263,923
Patented August 2, 1966

3,263,923
TWO MODE PNEUMATIC CONTROL SYSTEM
Roland A. Gladstone, Chicago, Ill., assignor to Honeywell Inc., Minneapolis, Minn., a corporation of Delaware
Filed Jan. 12, 1965, Ser. No. 424,969
11 Claims. (Cl. 236—1)

The present invention relates to a two mode pneumatic control system, and more particularly relates to an improved temperature control system of the summer-winter changeover type.

Two mode pneumatic control systems such as a summer-winter changeover system are well recognized in the art, but normally these systems require auxiliary control equipment with special and complex valving along with the controller in order to effect the changeover operation. A recent type of two mode control system for summer-winter operation has been suggested wherein two orifices are utilized to control at two different levels depending on the pneumatic supply pressure. This type of system utilizes an orifice in the line feeding the pneumatic control device or thermostat as well as utilizing an orifice to restrict the outlet flow of air from the control device or thermostat. Further, this system requires careful control of structural details in order to make the system operable. The present invention is an improvement in this general type of system wherein the second orifice at the thermostat is eliminated and the control function is provided by a different and simplified means.

The present invention is specifically directed to a two mode pneumatic control system which is supplied with pneumatic pressure at two different levels in order to obtain the summer and winter modes of operation. At the lower of the two pressures there is no opportunity for the controlled device to operate in an incorrect range, but at the higher of the two supply pressures it is possible for the controlled device to slip out of its proper range by a reduction in the pressure in the line caused by the control device, such as the thermostat, bleeding an excess amount of air to the atmosphere. The present invention overcomes this disadvantage by supplying a two level pressure control system that utilizes a pressure differential valve that operates across the restriction thereby maintaining the pressure in the system at a set level regardless of the loss of air created by the operation of the pneumatic condition responsive or thermostat means utilized with the system. This type of system utilizes either a reverse acting valve or utilizes some type of toggle means to operate a conventional valve in first a normally closed and then a normally open condition depending on the mode of operation of the overall system.

In its very broadest form the present invention is a pneumatic control system that is supplied from a two-level source of pneumatic pressure so that two modes of operation are possible. The air supplied is fed to a restriction that is regulated by a pressure differential valve to maintain a maximum pressure drop across the restriction equal to a desired pressure level to maintain the system in the selected mode of operation. In order to obtain the desired function, the pneumatic actuator means that is supplied with air by the system must be capable either within itself or driving a controlled device in a reversible fashion, or must be connected to a device that inherently reverses its function as it passes through a full stroke of operation.

The details of the present invention will be more clearly understood when the figures are considered along with the specific disclosure, wherein;

FIGURE 1 discloses a temperature control system having a summer and winter changeover arrangement utilizing a pressure differential valve and restriction of the invention when applied to a conventional actuator and a two position or reversible valve;

FIGURE 2 is a disclosure of basically the same system where a specific type of pressure differential valve is disclosed combined with a conventional linear pneumatic actuator that is applied to a toggle means operating a conventional valve from a normally closed position to an open position and then from an open position to a normally closed position, and;

FIGURE 3 is a partial disclosure of another embodiment wherein the pressure differential valve is directly incorporated within the actuator means itself.

Figure 1:
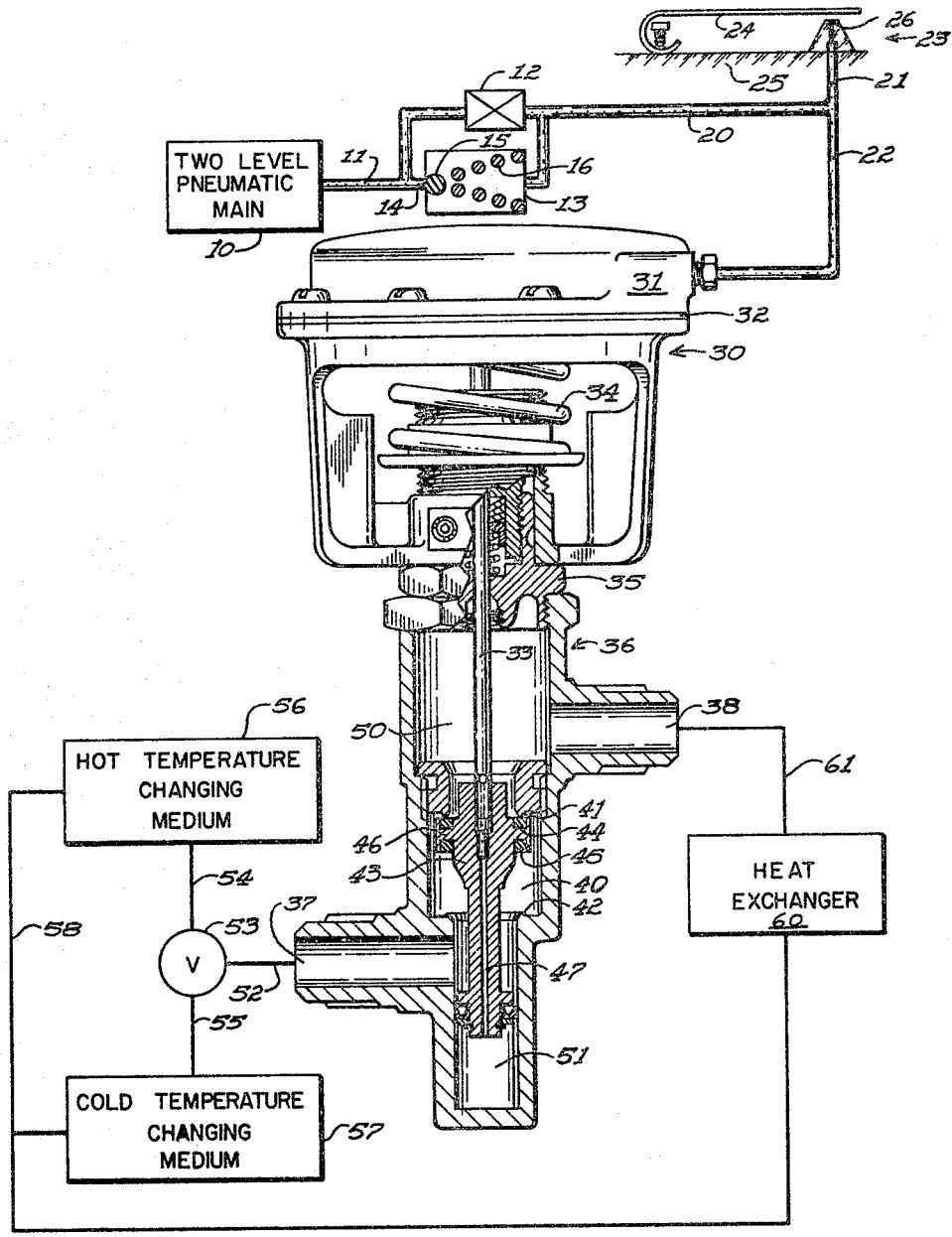

In FIGURE 1 there is disclosed a complete pneumatic control system that will be described specifically as a temperature control system of the summer-winter changeover type. It should be understood that the disclosure of FIGURE 1 is merely illustrative and that the principal could be applied to any two mode pneumatic control system utilizing a pneumatic condition responsive means.

A two level pneumatic source or main 10 is provided to supply two typical pressure levels such as 8 and 18 pounds per square inch. The lower pressure level of 8 pounds per square inch would be utilized during the cooling season or summer, and the higher or 18 pounds per square inch pressure would be utilized during the winter or heating season. The pressure is supplied on pipe 11 to a conventional restriction 12 and a pressure differential valve means 13. The pressure differential valve means 13 is connected directly across the restriction 12 and is shown in a simplified or schematic form. The pressure differential valve means 13 includes a ball 15 that forms the valve portion of the pressure differential valve means 13 and blocks the inlet 14. The ball 15 is held in place by a spring 16. The spring 16 is of sufficiently rigid form to apply a pressure on the ball 15 so that the ball 15 does not move from the inlet 14 unless there is a pressure differential across the pressure differential valve means 13 of 10 lbs. per square inch. It is thus apparent that when the lower pressure of 8 lbs. per square inch is applied from the main 10, the valve means 13 is ineffective. When the pressure level is switched to the 18 lbs. per square inch, the valve means 13 becomes operative, as will be more explicitly explained later in the present description.

The combination of the restriction 12 and valve means 13 is connected by pipe 20 to a pair of pipes 21 and 22. Pipe 21 is connected to a conventional thermostat disclosed generally at 23 and includes a bimetal 24 mounted on a base 25. The bimetal 24 operates against a nozzle 26. The thermostat or pneumatic condition responsive means 23 is of any conventional bleed type which bleeds the pneumatic pressure supplied on pipe 21 to the atmosphere according to the condition being sensed. This type of thermostat or pneumatic condition responsive means is well known in the art and is not believed to require any detailed description.

The pipe 22 is connected to a conventional actuator means generally shown at 30. The actuator means 30 has an air inlet chamber 31 above a diaphragm 32 and air supplied to the chamber 31 causes the diaphragm 32 to move applying a force to a piston (not shown) that in turn supplies a moving force to a rod 33. The actuator means 30 is of a conventional design and includes a return spring 34 to bias the diaphragm 32 in an upward direction when there is insufficient air pressure in the chamber 31 to cause the rod 33 to move in a downward direction. The device as shown in FIGURE 1 is in its full "up" position without the application of any air pressure.

The actuator means 30 is mounted by nut 35 on a valve means 36. Valve means 36 is a two position valve having a conventional inlet 37 and an outlet 38 connected by a chamber 40. The chamber 40 has a pair of valve seats 41 and 42 which are opposite one another and form the extremes to which a valve member 43 can move. The valve member 43 is connected directly to the shaft 33 and has a pair of valve discs 44 and 45 mounted thereon. The valve discs 44 and 45 are of the same size and character but are on opposite sides of a projection 46 which carries the discs 44 and 45. The disc 44 cooperates with valve seat 41 while the disc 45 cooperates with the valve seat 42 when the valve member 43 is in a full "down" position. A passage 47 is provided through the center of the valve member 43 to interconnect an outlet chamber 50 and a balancing chamber 51 so that pressure differentials in the valve means 36 can be balanced out so that a minimum amount of force is necessary to move the valve member 43. The chamber 50 is connected directly to the outlet 38 of the valve means 36.

It will be noted at this point that the valve means 36 has two extreme positions, that is movement between the valve seat 41 and the valve seat 42, and that at some intermediate point between these two points of extreme the valve means 36 reverses its normal valving function. This operation will be described more fully below.

Connected to the inlet 37 of the valve means 36 is a pipe 52 that is in turn connected to a valve 53 that has pipes 54 and 55 supplying a temperature changing medium such as water from a pair of sources. A hot temperature changing medium source 56 is disclosed along with a cold temperature changing medium source 57 and which sources have a common inlet pipe 58 that is in turn connected to a heat exchanger 60 that is in turn connected to the outlet 38 of the valve means 36 by means of pipe 61.

The valve 53 is set to select a fluid path from either the hot temperature changing medium source 56 or the cold temperature changing medium source 57 depending on the season of the year or the type of operation desired of the system. The change of valve 53 is accomplished at the same time as the two level pneumatic main or source 10 is changed or set up for summer or winter operation.

OPERATION OF FIGURE 1

The novel arrangement of the present invention can best be understood by considering the operation of the system as a summer-winter system with an explanation of the positions and control functions for each of the two seasons. If the summer mode is first considered, the two level pneumatic source or main 10 is adjusted to 8 lbs. per square inch and at the same time, the valve 53 is adjusted to allow fluid to flow from pipe 55 through the valve 53 into the pipe 52 to the inlet 37 of the valve means 36. This arrangement blocks the pipe 54 from the hot temperature changing medium thereby eliminating any possibility of a heating medium being put into the system. At the time the two level pneumatic main 10 is adjusted to 8 lbs. per square inch, the pressure is supplied to the pressure differential valve means 13 and restriction 12 which in turn supply this pressure to the pipe 20 and the thermostat 23 along with the pneumatic actuator 30. Since the pressure supplied by the two level pneumatic source or main 10 is below the pressure required to operate the pressure differential valve means 13, the thermostat will always be under the influence of a pressure up to the 8 lbs. per square inch level. The thermostat 23 is set for summer operation and the bimetal 24 modulates the space to the nozzle 26 to control the air flow in response to the ambient surrounding the thermostat 23. This varies the air pressure on the pipe 22 to the actuator means 30.

When the thermostat 23 has bimetal 24 sufficiently far distant from the nozzle 26 to bleed the pressure level below approximately 3 lbs. per square inch, the spring 34 of actuator means 30 causes the actuator rod 33 to move to the position shown in FIGURE 1. This closes the valve means 36 between the inlet 37 and the outlet 38 thereby blocking any coolant from passing through the valve means 36 to the heat exchanger 60. As the temperature rises in the area around the thermostat 23, the bimetal 24 approaches the nozzle 26 closing down this nozzle and increasing the pressure on pipe 22 to the actuator 30 thereby causing the rod 33 to be driven in a downward direction. The actuator 30 is selected so that a full 8 lbs. supplied on pipe 22 by the closing of the nozzle 26 by the bimetal 24 will merely drive the rod 33 so that the valve member 43 reaches an intermediate position between the valve seats 41 and 42. This is then a full open position allowing a complete circulation of a coolant through the heat exchanger 60 thereby tending to reduce the temperature at the thermostat 23. This system operates in a conventional manner as should be well recognized, as long as the valve member 43 operates between an intermediate position and the position shown in FIGURE 1.

Now if it becomes desirable to switch the system over to winter operation, the two level pneumatic main 10 is adjusted to 18 lbs. per square inch and the valve 53 is adjusted to block pipe 55 and open pipe 54 thereby allowing a hot temperature changing medium to flow through the valve means 36. In order to have the thermostat function properly the reverse function must occur in the valve means 36 from that previously described. As a result of this, it it noted that with the application of the 18 lbs. per square inch the pressure differential valve means 13 comes into play. The pressure differential valve means 13 opens sufficiently to bleed air to the control system along with the restriction 12 so that the pressure in line 20 can never drop below the 18 lbs. per square inch less the 10 lbs. per square inch pressure differential setting of the valve means 13. As a result of this, the pressure in the line 20 can never drop below 8 lbs. per square inch, but can rise as high as 18 lbs. per square inch with a normal operating range of 8 to 13 lbs. per square inch in most conventional pneumatic temperature control systems.

It has been previously noted that the application of 8 lbs. per square inch on pipe 22 to the actuator means 30 drives the actuator rod 33 in a downward direction so that the valve member 43 is at an intermediate point where the valve means 36 is full open. An increase in pressure above 8 lbs. per square inch drives the valve member 43 in a downward direction thereby closing the valve disc 45 against the valve seat 42 providing a reverse valving function than that obtained with the cold temperature changing medium applied during summer operation. It is thus apparent that the operation of the thermostat 23 to modulate air flow at the nozzle 26 causes a modulating air pressure in the actuator means 30 that varies between a minimum of 8 lbs. per square inch in a maximum of 18 lbs. per square inch depending on the position of the thermostat means 23. This gives a full range of control of the valve member 43 between the intermediate point and the full down position.

A simple temperature changeover system has been provided by the simple expedient of the utilization of a pressure differential valve means applied across the restriction supplying air to a conventional bleed type of thermostat, along with the operation of a valve for control of the heating or cooling fluid wherein the valve operates from a first extreme position to an intermediate position for one mode of operation and from the intermediate position to the opposite extreme position for the second mode of operation.

In FIGURE 2 there is disclosed a similar but reverse acting system from that of FIGURE 1 that utilizes a conventional valve and toggle mechanism. The two level pneumatic source or main 10 is supplied once again and in turn supplies pressure on pipe 11 to a pressure differential valve means 13'. The valve means 13' includes a valve body 70 that has an opening 71 that is sealed by an O-ring 72 and a plate 73. The plate 73 has an orifice 74 that in fact is the same as the restriction 12 of FIGURE 1. By the arrangement that is now being described, the restriction and the pressure differential valve means are incorporated into a single unit 13'.

A spring 75 is placed behind the plate 73 and holds the plate 73 against the O-ring 72 and the body 70 so that the orifice or restriction 74 is effective in the position shown. An upper body member 76 is provided with a sealing O-ring 77 to complete the valve means 13'. Connected to one port of the body 76 by pipe 21 is a pneumatic condition responsive means or thermostat 23. Also connected to the body means 76 is a pipe 22 that is in turn connected to a pneumatic actuator 30'. The pneumatic actuator 30' has basically the same function as the actuator 30 disclosed in FIGURE 1 but is of a different general type. The actuator 30' has an output shaft 33' that is supported between the actuator 30' and a bearing 80. The bearing 80 is supported by a bracket 81 that in turn supports the actuator means 30'. Attached to the shaft 33' by a pin 82 is a lever 83. The lever 83 along with the pin 82 and the shaft 33' form a toggle mechanism or means that is pivoted at 84 to a valve shaft 85. The valve shaft 85 passes through conventional packing means 86 that is mounted generally in the valve body 90. The valve means 90 has inlet 91 and an outlet 92 that are separated by a valve seat 93. A plug 94 passes through the valve seat 93 and carries a valve disc 95. The plug 94 is attached to the shaft 85 and forms a conventional type of valve. The inlet 91 supplies fluid around the plug 94 in the position shown to the outlet 92. The valve is shown in a normally open condition. As the shaft 33' moves to the right, the toggle mechanism drives the shaft 85 in a downward direction closing the valve disc 95 against the valve seat 93 thereby closing off the valve means 90 when the pin 82 is directly over the shaft 85. As the actuator shaft 33' continues to move to the right, the toggle mechanism lifts the shaft 85 thereby opening the valve disc 95 from the valve seat 93 to open the valve once again.

It is thus apparent that a valve means 90 is provided with a toggle action so that the valve operates from a full open condition to a full closed condition, and then to a full open condition once again with the movement of the shaft 33' from left position as shown in FIGURE 2 to a full righthand position when the pneumatic actuator means 30' is energized with air pressure. The actuator means 30' has an internal spring that returns it to the position shown in FIGURE 2 when no air is supplied. This type of actuator means is well known in the art, for example as shown in U.S. Patent 3,082,792 to Jenkins on March 26, 1963. The main point to be considered now is the fact that for a straight line motion of the shaft 33', the valve means 90 passes from a normally open type valve function to a normally closed type valve function thereby reversing its function.

OPERATION FIGURE 2

Once again the novel concept can best be understood by a simple explanation of the operation of the system. If the pneumatic main 10 is supplied with 8 lbs. per square inch, the pressure differential valve means 13' is effective only as an orifice 74 and supplies air to the thermostat 23 and to pipe 22 for the pneumatic actuator means 30'. The modulation of the thermostat 23 causes a pressure to be supplied to the pneumatic actuator 30' between a relatively low level and up to a maximum of 8 lbs. per square inch. The 8 lbs. per square inch causes the actuator means 30' to move the toggle mechanism so that the lever 83 is perpendicular and in line with the shaft 85 of the valve means 90 thereby closing the disc 95 against the valve seat 93. This range would be the winter or heating position of the system of FIGURE 2.

When the two level pneumatic main 10 is switched to 8 lbs. per square inch, the plate 73 moves off the O-ring 72 allowing air to bleed around the O-ring thereby supplying a greater amount of air to the thermostat 23 and the pneumatic actuator 30'. This drives the output shaft 33' of the actuator between an intermediate position and an extreme position to the right. This causes the valve to modulate in a reverse function from that described when the maximum of 8 lbs. per square inch was supplied by the two level pneumatic source or main 10.

It is thus apparent that a two level or two mode pneumatic control system is again suppled and the system is locked in one mode of operation by the pressure differential valve not allowing the system to bleed down below a preset level of the difference of 10 lbs. per square inch which would be a minimum of 8 p.s.i. when an 18 lbs. source was supplied.

In FIGURE 3 a further modification is disclosed wherein the orifice and pressure differential valve means are mounted within the end of the pneumatic actuator, as of the type disclosed in FIGURE 2. An actuator 30" is again disclosed but in this case the end 100 has been flared to receive a diaphragm 101 that is used as the output diaphragm of the actuator. A second housing member 102 is provided that is clamped, by any convenient means (not shown) to provide an air tight seal. Mounted on the flange 102 is an outlet 103 which is connected to a thermostat 23 by means of pipe 21. An inlet or port 104 is provided in the member 102 which has a pipe 105 connected to a two pressure pneumatic source or main 10. Mounted between the diaphragm 101 and the housing 102 is a leaf spring 110 which is supported by the screw 111 in a projection 112. The leaf spring in turn has an orifice 113 and a valve member 114 that seats against a valve seat 115. The valve seat 115 is formed integrally with the housing 112. A hole 116 is provided for convenient flow of air from the orifice 113 to the pipe 21 and the thermostat 23.

OPERATION FIGURE 3

The two level supply source is connected to pipe 105 and supplies pressure to the end of the actuator means 30" at the inlet 104. The air bleeds through the orifice 113 to the diaphragm 101 and through the hole 116 to the thermostat 23. This supplies a normal orifice and thermostat arrangement for controlling the actuator means 30" in the first stage of operation which has been previously represented as in the range of up to 8 lbs. per square inch. If the two level pneumatic main 10 is adjusted to the 18 lbs. per square inch level, the leaf spring 110 deflects opening the valve member 114 from the valve seat 115 bleeding the excess air needed around the orifice 113 to the thermostat 23 as well as to the diaphragm 101 of the actuator means 30". It can thus be seen that the orifice and pressure differential valve means have been built into the end of an actuator means for convenience, cost saving, and simplicity.

The present invention basically encompasses a two level or two mode pneumatic temperature control system that can be applied to any pneumatic system where two individual modes of operation are necessary. The heart of the present invention is the utilization of a restriction with a pressure differential valve across the restriction to supply excess air when the system is operated in the second or higher pressure mode of operation. The invention also entails the utilization of an actuator or control mechanism that has a reversible function to take advantage of the two mode operation. The arrangement described in detail in the three figures of the present application have been specifically brought out in claim language and the applicant in no way wishes to be restricted to the specific details that have been disclosed in this drawing and specification, except as limited by the scope of the appended claims.

I claim as my invention:

1. A two mode pneumatic control system, including: a two level pneumatic source having a first pressure level for operating said system in a first mode, and a second pressure level for operating said system in a second mode;

pressure differential valve means including a continuously open restriction connected to said source to receive said pressure levels; said differential valve means operating to bypass said restriction when a predetermined pressure differential exists across said restriction to maintain said system in a selected mode of operation; said pressure differential valve means further connected to pneumatic condition responsive means and pneumatic actuator means to supply said last two named means with an operating pressure; and said pneumatic actuator means having at least two extreme positions and an intermediate position wherein said pneumatic actuator means is operative between a first extreme position and said intermediate position for said first mode of operation with said first pressure level applied; said pneumatic actuator means operative between a second extreme position and said intermediate position for said second mode of operation with said second pressure level applied.

2. A summer-winter pneumatic temperature control system, including: a two level pneumatic source having a first pressure level for operating said system in a summer mode, and a second pressure level for operating said system in a winter mode; pressure differential valve means including a continuously open restriction connected to said source to receive said pressure levels; said differential valve means operating to bypass said restriction when a predetermined pressure differential exists across said restriction to maintain said system in the selected mode of operation; said pressure differential valve means further connected to a bleed type pneumatic thermostat and pneumatic actuator means to supply said last named means and said thermostat with an operating pressure; and said pneumatic actuator means having at least two extreme positions and an intermediate position wherein said pneumatic actuator means is operative between a first extreme position and said intermediate position for said summer mode of operation with said first pressure level applied; said pneumatic actuator means operative between a second extreme position and said intermediate position for said winter mode of operation with said second pressure level applied.

3. A two mode pneumatic control system, including: a two level pneumatic source having a first pressure level for operating said system in a first mode, and a second pressure level for operating said system in a second mode; pressure differential valve means including a continuously open restriction connected to said source to receive said pressure levels; said differential valve means operating to bypass said restriction when a predetermined pressure differential exists across said restriction to maintain said system in a selected mode of operation; said pressure differential valve means further connected to bleed type pneumatic condition responsive means and pneumatic actuator means to supply said last two named means with an operating pressure; and reversible valve means operatively driven by said pneumatic actuator means wherein said reversible valve means reverses its operation from said first mode to said second mode upon a change in level of pressures from said pressure source.

4. A summer-winter pneumatic temperature control system, including: a two level pneumatic source having a first pressure level for operating said system in a summer mode, and a second pressure level for operating said system in a winter mode; a pressure differential valve including a continuously open restriction connected to said source to receive said pressure levels; said differential valve operating to bypass said restriction when a predetermined pressure differential exists across said restriction to maintain said system in a selected mode of operation; said pressure differential valve further connected to a pneumatic thermostat and a pneumatic actuator to supply said actuator and said thermostat with an operating pressure; and reversible valve means operatively driven by said pneumatic actuator wherein said reversible valve means reverses its operation from said summer mode to said winter mode upon a change in said level of pressure from said pressure source.

5. A two mode pneumatic control system, including: a two level pneumatic source having a first pressure level for operating said system in a first mode, and a second pressure level for operating said system in a second mode; pressure differential valve means including a continuously open restriction connected to said source to receive said pressure levels; said differential valve means operating to bypass said restriction when a predetermined pressure differential exists across said restriction to maintain said system in a selected mode of operation; said pressure differential valve means further connected to bleed type pneumatic condition responsive means and pneumatic actuator means to supply said last two named means with an operating pressure; reversible valve means operatively driven by said pneumatic actuator means; said reversible valve means including a pair of oppositely disposed valve seats fixed between an inlet and an outlet of said reversible valve means; and a movable valve member between said valve seats and having a pair of oppositely disposed valve discs which cooperate with said valve seats to reverse the function of said reversible valve means to correspond to said selected mode of operation upon movement of said member between said seats.

6. A summer-winter pneumatic temperature control system, including: a two level pneumatic source having a first pressure level for operating said system in a summer mode, and a second pressure level for operating said system in a winter mode; a pressure differential valve including a continuously open restriction connected to said source to receive said pressure levels; said differential valve operating to bypass said restriction when a predetermined pressure differential exists across said restriction to maintain said system in a selected mode of operation; said pressure differential valve further connected to a pneumatic thermostat and pneumatic actuator means to supply said pneumatic actuator means and said thermostat with an operating pressure; a reversible valve operatively driven by said pneumatic actuator means; said reversible valve including a pair of oppositely disposed valve seats fixed between an inlet and an outlet of said reversible valve; and a movable valve member between said seats and having a pair of oppositely disposed valve discs which cooperate with said valve seats to reverse the function of said reversible valve to correspond to said selected mode of operation upon movement of said member between said seats.

7. A two mode pneumatic control system, including: a two level pneumatic source having a first pressure level for operating said system in a first mode, and a second pressure level for operating said system in a second mode; pressure differential valve means including a continuously open restriction connected to said source to receive said pressure levels; said differential valve means operating to bypass said restriction when a predetermined pressure differential exists across said restriction to maintain said system in a selected mode of operation; said pressure differential valve means further connected to bleed type pneumatic condition responsive means and pneumatic actuator means to supply said last two named means with an operating pressure; reversible valve means including toggle means operatively driven by said pneumatic actuator means with said toggle means reversing the direction of valve movement with the mode of operation of said system; said reversible valve means including a valve seat fixed between an inlet and an outlet of said reversible valve means; and a movable valve member driven by said toggle means and cooperating with said valve seat to provide a normally open condition with said first operating mode and a normally closed condition with said second operating mode.

8. A summer-winter pneumatic temperature control system, including: a two level pneumatic source having a first pressure level for operating said system in a summer mode, and a second pressure level for operating said system in a winter mode; pressure differential valve means including a continuously open restriction connected to said source to receive said pressure levels; said differential valve means operating to bypass said restriction when a predetermined pressure differential exists across said restriction to maintain said system in a selected mode of operation; said pressure differential valve means further connected to a pneumatic thermostat and pneumatic actuator means to supply said pneumatic actuator means and said thermostat with an operating pressure; reversible valve means including toggle means operatively driven by said pneumatic actuator means with said toggle means reversing the direction of valve movement with the mode of operation of said system; said reversible valve means including a valve seat fixed between an inlet and an outlet of said reversible valve means; and a movable valve member driven by said toggle means and cooperating with said valve seat to provide a normally open condition with said winter operating mode and a normally closed condition with said summer operating mode.

9. A two mode pneumatic control system, including: a two level pneumatic source having a first pressure level for operating said system in a first mode, and a second pressure level for operating said system in a second mode; pressure differential valve means connected to said source to receive said pressure levels and including a spring biased valve member with a continuously open restriction therethrough biased against a fixed member; said spring biased valve member moving from said fixed member to open a bypass around said restriction when a predetermined pressure differential exists across said restriction to maintain said system in a selected mode of operation; said pressure differential valve means further connected to pneumatic condition responsive means and pneumatic actuator means to supply said last two named means with an operating pressure; and said pneumatic actuator means having at least two extreme positions and an intermediate position wherein said pneumatic actuator means is operative between a first extreme position and said intermediate position for said first mode of operation with said first pressure level applied; said pneumatic actuator means operative between a second extreme position and said intermediate position for said second mode of operation with said second pressure level applied.

10. A summer-winner pneumatic temperature control system, including: a two level pneumatic source having a first pressure level for operating said system in a summer mode, and a second pressure level for operating said system in a winter mode; pressure differential valve means connected to said source to receive said pressure levels and including a leaf spring biased valve member with a continuously open restriction therethrough biased against a fixed member; said leaf spring biased valve member moving from said fixed member to open a bypass around said restriction when a predetermined pressure differential exists across said restriction to maintain said system in a selected mode of operation; said pressure differential valve means further connected to a pneumatic thermostat and a pneumatic actuator to supply said thermostat and said actuator with an operating pressure; and said pneumatic actuator having at least two extreme positions and an intermediate position wherein said pneumatic actuator is operative between a first extreme position and said intermediate position for said summer mode of operation with said first pressure level applied; said pneumatic actuator operative between a second extreme position and said intermediate position for said winter mode of operation with said second pressure level applied.

11. A two mode pneumatic control system, including: pneumatic actuator means having an input air chamber; pressure differential valve means included within said chamber; said pressure differential valve means including a spring biased valve member with a continuously open restriction therethrough biased against a fixed member; said spring biased valve member moving from said fixed member to open a bypass around said restriction when a predetermined pressure differential exists across said restriction; a two level pneumatic source having a first pressure level for operating said system in a first mode, and a second pressure level for operating said system in a second mode; said air source connected to said pressure differential valve means to supply pressure to said input air chamber to operate said actuator means; said input air chamber further connected to pneumatic condition responsive means to supply last named means with an operating pressure; and said pneumatic actuator means having at least two extreme positions and an intermediate position wherein said pneumatic actuator means is operative between a first extreme position and said intermediate position for said first mode of operation with said first pressure level applied; said pneumatic actuator means operative between a second extreme position and said intermediate position for said second mode of operation with said second pressure level applied.

References Cited by the Examiner
UNITED STATES PATENTS

| | | | |
|---|---|---|---|
| 3,194,497 | 7/1965 | Thorburn | 236—1 |
| 3,216,660 | 11/1965 | Mott | 236—1 |

EDWARD J. MICHAEL, *Primary Examiner.*